(12) United States Patent
Chaloupli et al.

(10) Patent No.: US 11,859,081 B2
(45) Date of Patent: Jan. 2, 2024

(54) BIOBASED ADDITIVE FOR THERMOPLASTIC POLYESTERS

(71) Applicant: Queen's University at Kingston, Kingston (CA)

(72) Inventors: Naqi Najafi Chaloupli, North York (CA); Marianna Kontopoulou, Kingston (CA); Heather Leigh Simmons, Newmarket (CA); Praphulla, Kingston (CA)

(73) Assignee: Queen's University at Kingston, Kingston (CA)

( * ) Notice: Subject to any disclaimer, the term of this patent is extended or adjusted under 35 U.S.C. 154(b) by 0 days.

(21) Appl. No.: 18/083,106

(22) Filed: Dec. 16, 2022

(65) Prior Publication Data

US 2023/0193022 A1 Jun. 22, 2023

Related U.S. Application Data

(63) Continuation of application No. 16/629,335, filed as application No. PCT/CA2018/050844 on Jul. 11, 2018, now Pat. No. 11,535,745.

(60) Provisional application No. 62/531,107, filed on Jul. 11, 2017.

(51) Int. Cl.
| | |
|---|---|
| *C08L 67/04* | (2006.01) |
| *B33Y 70/00* | (2020.01) |
| *B29B 9/02* | (2006.01) |
| *B29B 9/12* | (2006.01) |
| *C08K 5/00* | (2006.01) |
| *C08K 5/12* | (2006.01) |
| *C08K 5/14* | (2006.01) |
| *C08K 5/3492* | (2006.01) |
| *B33Y 80/00* | (2015.01) |

(52) U.S. Cl.
CPC ............ *C08L 67/04* (2013.01); *B29B 9/02* (2013.01); *B29B 9/12* (2013.01); *B33Y 70/00* (2014.12); *C08K 5/0083* (2013.01); *C08K 5/12* (2013.01); *C08K 5/14* (2013.01); *C08K 5/34924* (2013.01); *B29B 2009/125* (2013.01); *B33Y 80/00* (2014.12)

(58) Field of Classification Search
CPC .. C08L 67/04; B29B 9/02; B29B 9/12; B33Y 70/00; B33Y 80/00; C08K 5/12; C08K 5/14; C08K 5/0083; C08K 5/34924
USPC ........................................................ 525/450
See application file for complete search history.

(56) References Cited

U.S. PATENT DOCUMENTS

| | | | |
|---|---|---|---|
| 4,626,570 A | 12/1986 | Gardner | |
| 6,110,983 A | 8/2000 | Tokoro et al. | |
| 2008/0182924 A1* | 7/2008 | Morimoto | C08L 1/00 524/502 |
| 2010/0292381 A1 | 11/2010 | Kamikawa | |
| 2015/0051320 A1 | 2/2015 | Huang et al. | |

FOREIGN PATENT DOCUMENTS

| | | |
|---|---|---|
| CA | 2617032 | 7/2008 |
| CA | 2775181 | 5/2011 |
| EP | 1813648 A1 | 8/2007 |
| EP | 3159127 A2 | 4/2017 |
| WO | WO1995/09202 | 4/1995 |

OTHER PUBLICATIONS

U.S. Appl. No. 16/629,335, filed Jan. 8, 2020, Chaloupli, N. et al.
International Search Report and Written Opinion for corresponding International Patent Application No. PCT/CA2018/050844.
European Examination Report dated Oct. 4, 2022 for corresponding European Application No. 18832889.2.

* cited by examiner

*Primary Examiner* — Hui H Chin
(74) *Attorney, Agent, or Firm* — Angela Lyon

(57) ABSTRACT

A biobased additive is provided that is both a nucleating and a reinforcing agent when added to thermoplastic polyester (e.g., biopolyesters). A composite material, which is an additive-reinforced biopolyester, was prepared and improved thermo-mechanical properties were quantified. This composite material is a new class of biobased material that offers a sustainable, environmentally-friendly solution for packaging and other applications.

12 Claims, 9 Drawing Sheets

| BF Content (wt%) | HDT (°C) |
|---|---|
| 0 | 55 |
| 1 | 61 |
| 5 | 60 |
| 7 | 61 |
| 10 | 61 |

BIOBASED ADDITIVE FOR THERMOPLASTIC POLYESTERS

FIELD

The invention relates to additives for polyesters used to make thermoformed, injection molded, or extruded products. More specifically, the invention relates to a thermoset polyester additive substantially derived from renewable resources.

BACKGROUND

There has been explosive growth world-wide in recent years in the field of bioplastics. This growth has been driven by environmental concerns, waste disposal challenges, and consumer demand for sustainable products. Bioplastics is a broad term that is used for biobased, biodegradable, or both biobased and biodegradable plastics. An example of bioplastics is thermoplastic biopolyesters. Thermoplastic biopolyesters exhibit a wide range of properties from brittle to elastomeric, depending on chain structure.

In spite of the potential of thermoplastic biopolyesters, only a few are used on a commercial scale. Challenges such as high production costs, slow crystallization rates, and low melt strength are associated with slow acceptance of biopolyesters in high value added engineering applications since these challenges restrict processability of biopolyesters under standard polymer processing operations. Other challenges of biopolyesters include their hygroscopic nature, susceptibility to degradation, and poor engineering properties. Improving the properties of biopolyesters to performance-match petroleum-based polymers is desired. One such goal is achieving fully biobased, biodegradable, and cost-effective formulations that have engineering properties suitable for value-added applications. Accordingly, manufacturing polymer-based products from renewable resources is desired.

Poly(lactid acid) (PLA, also known as polylactide) is a renewable-resource based aliphatic polyester, which can be biodegradable and compostable under favourable conditions. PLA is a versatile thermoplastic polyester, with properties that are comparable to petroleum-based commodity polymers. Therefore, it is viewed as a viable sustainable alternative to petroleum-sourced plastics. As part of the drive for increased renewable content in products, thermoplastic products made out of PLA have attracted considerable attention in sectors such as consumer goods, packaging, foams, and recently more high-end applications such as automotive.

Since it is a linear polyester, PLA crystallizes slowly which results in poor mechanical properties and extended processing times. These properties mean timeframes for PLA processing differ from timeframes for petroleum-based polymer processing, which make it difficult to adapt PLA to conventional polymer manufacturing processes. The time that these materials take to crystallize from the melt can be a few hours, which is too long compared to most conventional thermoplastic polyesters. This makes them difficult to melt process in a cost-effective way using conventional techniques like injection molding, thermoforming, extrusion, etc. To counteract the slow crystallization, post-processing annealing is required. Given the shortcomings of PLA, there is a need for modification to improve its processability.

SUMMARY

In one aspect, a composite material is provided that includes thermoplastic polyester, and a particulate additive comprising a thermoset biopolyester, wherein the particulate additive reinforces and nucleates the thermoplastic polyester. In one embodiment, the thermoplastic polyester is biodegradable or bioderived or both. In one embodiment, the thermoplastic polyester is a non-bioderived polyester. In one embodiment, the thermoplastic polyester is polyethylene terephthalate (PET), polybutylene terephthalate (PBT), polycaprolactone (PCL), polyethylene succinate (PES), polybutylene succinate (PBS), poly(butylene adipate-co-terephthalate) (PBAT), or a combination thereof. In one embodiment, the thermoplastic polyester is poly(lactide) (PLA), poly-3-(hydroxyalkanoate) (PHA), polyhydroxybutyrate (PHB), poly(3-hydroxybutyrate-co-3-hydroxyvalerate (PHBV), or a combination thereof. In one embodiment, the thermoplastic polyester is poly(lactide) (PLA). In one embodiment, the thermoset biopolyester comprises biopolyester, free radical initiator, and a crosslinking agent. In one embodiment, the amount of crosslinking agent is about 0.5 wt % to about 2.5 wt % of the thermoset biopolyester. In one embodiment, the crosslinking agent is an allylic or acrylate crosslinking agent. In one embodiment, the crosslinking agent comprises TAM or TAIP. In one embodiment, an amount of free radical initiator is about 0.3 to about 2.5 wt % of the thermoset biopolyester. In one embodiment, the free radical initiator is DCP, Luperox® L101, or Luperox® L130. In one embodiment, the composite material is about 80 to about 99.9 wt % biobased. In one embodiment, a ratio of thermoplastic polyester to thermoset biopolyester by weight is 99:1, 90:10, 80:20, 70:30, 60:40, or 50:50.

In one aspect, the invention provides a biobased additive that includes a particulate of thermoset biopolyester, wherein the biobased additive is suitable for reinforcing and nucleating thermoplastic polyester. In one embodiment, the thermoset biopolyester comprises poly(lactide) (PLA), poly-3-(hydroxyalkanoate) (PHA), polyhydroxybutyrate (PHB), poly(3-hydroxybutyrate-co-3-hydroxyvalerate (PHBV), polycaprolactone (PCL), poly(butylene adipate-co-terephthalate) (PBAT), polyethylene succinate (PES), polybutylene succinate (PBS), or a combination thereof. In one embodiment, the thermoset biopolyester comprises PLA, dicumyl peroxide (DCP), and triallyl trimesate (TAM), or triallyl isocyanurate (TAIC), or a combination thereof. In one embodiment, the biobased additive includes about 95 to about 99% by weight bioderived content. In one embodiment, the thermoset biopolyester has a particle size of about 10 to about 150 micrometers. In one embodiment, the thermoset biopolyester comprises biopolyester, a free-radical initiator, and an allylic or acrylate crosslinking agent. In one embodiment, the thermoset biopolyester comprises about 20% or higher of gel content. A In one aspect, the invention provides a method of making the composite material of the above aspect, that includes preparing thermoset biopolyester by heating biopolyester to a temperature sufficient to (i) melt the biopolyester, and (ii) decompose a selected free radical initiator, adding about 0.5 to about 2.5 wt % of the free radical initiator and about 0.5 to about 2.5 wt % of a crosslinking agent to the biopolyester, and mixing until thermoset biopolyester particles form, optionally reducing particle size by continued mixing and/or grinding the particles, adding thermoplastic polyester, and forming reinforced thermoplastic polyester. In one embodiment, the thermoplastic polyester is a biopolyester. In one embodiment, the biopolyester of the thermoplastic polyester and the biopolyester of the thermoset biopolyester are the same. In one embodiment, the biopolyester is PLA. In one embodiment, the reinforced thermoplastic polyester has a ratio of thermoplastic polyester to thermoset biopolyester of 99:1, 95:5, 90:10, 80:20, 70:30, 60:40, or 50:50 by weight. In one embodiment, the mixing is performed in an internal batch mixer. In one embodiment, the grinding is performed in a ball milling machine, or a wet mill microgrinder. In one embodiment, the method further includes isothermal conditioning between about 80 to about 120° C.

In one aspect, the invention provides a method of making the biobased additive of the above aspect, including heating biopolyester to a temperature sufficient to (i) melt the biopolyester, and (ii) decompose a selected free radical initiator, adding about 0.5 to about 2.5 wt % of the selected free radical initiator and about 0.5 to about 2.5 wt % of a crosslinking agent to the biopolyester, mixing until particles of thermoset biopolyester form, and optionally reducing particle diameter by continued mixing and/or grinding the particles. In one embodiment, the biobased additive has a particle size of about 10 to about 150 micrometers.

In one aspect, the invention provides a method of reinforcing and melt strengthening thermoplastic polyester, including adding the biobased additive of the above aspect to uncrosslinked thermoplastic polyester. In one embodiment, the adding is performed in a melt state of the thermoplastic polyester. In one embodiment, the thermoplastic polyester is polyethylene terephthalate (PET), polybutylene terephthalate (PBT), polycaprolactone (PCL), polyethylene succinate (PES), polybutylene succinate (PBS), poly(butylene adipate-co-terephthalate) (PBAT), polylactide (PLA), poly-3-(hydroxyalkanoates) (PHAs), polyhydroxybutyrate (PHB), poly(3-hydroxybutyrate-co-3-hydroxyvalerate (PHBV), or a combination thereof. In one embodiment, the adding comprises dry mixing or melt compounding. In one embodiment, the method further includes thermoforming, injection molding, or extruding the reinforced thermoplastic polyester. In one embodiment, extruding comprises additive manufacturing.

In one aspect, the invention provides an article of manufacture comprising the composite material of the above aspect and its embodiments. In one embodiment, the article is clothing, packaging, bottles, office stationary, food containers, disposable cutlery, disposable plates, toys, an article of manufacture made from plastic, injection molded articles, car parts, consumer products, building materials, products of 3D printing/additive applications, foams, automotive parts, an article that was prepared by 3D printing, biomedical articles, sutures, stents, dialysis media, and drug delivery devices.

In one aspect, a composite material is provided that is an additive-reinforced biopolyester, comprising biopolyester, and a fine particulate biobased additive that comprises thermoset biopolyester, wherein the biobased additive reinforces and nucleates the biopolyester.

In one, a biobased additive is provided for reinforcing and nucleating biopolyester, comprising a fine particulate of thermoset biopolyester, wherein the additive is suitable for reinforcing and nucleating biopolyester.

In one aspect, a method of making the composite material is provided, comprising preparing the thermoset biopolyester by heating biopolyester to a temperature sufficient to (i) melt the biopolyester, and (ii) decompose a selected free radical initiator, adding 0.5 to 2.5 wt % of the free radical initiator and 0.5 to 2.5 wt % of a crosslinking agent to the biopolyester, and mixing until thermoset biopolyester particles form, optionally forming particles by continued mixing and/or grinding the particles, and adding biopolyester to form reinforced biopolyester. In one embodiment, the adding biopolyester is performed in a melt state.

In one aspect, a method is provided of making the biobased additive of the above aspect, comprising heating biopolyester to a temperature sufficient to (i) melt the biopolyester, and (ii) decompose a selected free radical initiator, adding 0.5 to 2.5 wt % of the free radical initiator and 0.5 to 2.5 wt % of a crosslinking agent to the biopolyester, mixing until particles of thermoset biopolyester form, and optionally forming particles of smaller diameter by continued mixing and/or grinding the particles.

In one aspect, a method is provided of reinforcing and melt strengthening biopolyester, comprising adding the biobased additive to uncrosslinked biopolyester.

In one aspect, an article of manufacture is provided that comprises the composite of the above aspect. In one embodiment of all of the above aspects, the polyester is PLA.

In an embodiment of the composite material aspect, the thermoset polyester was prepared from polyester, free radical initiator, and a crosslinking agent. In one embodiment, the crosslinking agent is an allylic or acrylate crosslinking agent. In one embodiment, an amount of free radical initiator was about 0.3 to about 2.5 wt % of the thermoset polyester. In one embodiment, the free radical initiator was DCP, Luperox® L101, or Luperox® L130. In one embodiment, the crosslinking agent was TAM or TAIP. In one embodiment, the polyester is poly(lactide) ("PLA"), poly-3-(hydroxyalkanoate) ("PHA"), polycaprolactone ("PCL"), polybutylene succinate ("PBS"), poly(butylene adipate-co-terephthalate) ("PBAT"), polyethylene terephthalate (PET), or a combination thereof. In one embodiment, the amount of free radical initiator is about 1 wt % of the thermoset polyester. In one embodiment, the amount of crosslinking agent is about wt % to about 2.5 wt % of the thermoset polyester. In one embodiment, the amount of crosslinking agent is about 1 wt % of the thermoset polyester. In one embodiment, the amount of crosslinking agent is about 1 wt % and the amount of initiator is about 1 wt % of the thermoset polyester. In one embodiment, the biobased content of the composite is about 80 to about 99.9 wt %.

In one embodiment of the method aspect, adding includes dry mixing or melt compounding. In one embodiment, the method further comprises thermoforming, injection molding, or extruding the reinforced biopolyester. In one embodiment, extruding comprises additive manufacturing. In one embodiment, the biopolyester and the biopolyester of the thermoset biopolyester are the same or different. In one embodiment, the ratio of biopolyester to thermoset biopolyester is 90:10. In one embodiment, the ratio of biopolyester to thermoset biopolyester is 80:20. In one embodiment, the ratio of biopolyester to thermoset biopolyester is 85:15. In one embodiment, the ratio of biopolyester to thermoset biopolyester is 70:30.

In one embodiment the samples were conditioned isothermally at crystallization temperatures between about 80 to about 120° C.

In one embodiment of the above aspects, the biopolyester is PLA. In one embodiment, the thermoset biopolyester was prepared by mixing biopolyester, a free-radical initiator, and an allylic or acrylate crosslinking agent. In one embodiment, the biopolyester is PLA, PHA, PCL, PBS, and/or PBAT. In one embodiment, the free radical initiator is dicumyl peroxide (DCP), and the crosslinking agent is triallyl trimesate (TAM), or triallyl isocyanurate (TAIC). In one embodiment, the amount of free-radical initiator is about 0.5 wt % to about 2.5 wt %. In one embodiment, the amount of free-radical initiator is about 1 wt %. In one embodiment, the amount of crosslinking agent is about 0.5 wt % to about 2.5 wt %. In one embodiment, the amount of crosslinking agent is about 1 wt %. In one embodiment, the crosslinking agent is TAM and the free-radical initiator is DCP. In one embodiment, the amount of TAM is about 1 wt % and the amount of DCP is about 1 wt %. In one embodiment, the amount of biopolyester is about 95 to about 99 wt %.

In one embodiment of above aspects, the size of particles is a diameter or cross measurement of about 10 to about 150 μm. In one embodiment the diameter or cross measurement is less than 10 μm.

In certain embodiments, the article of manufacture is clothing, packaging, bottles, office stationary, food containers, disposable cutlery, disposable plates, toys, an article of manufacture made from plastic, injection molded articles, consumer products, building materials, products of 3D printing/additive applications, packaging, foams, automotive parts, biomedical articles, sutures, stents, dialysis media, and drug delivery devices.

In one embodiment, mixing is performed in an internal batch mixer and grinding is performed in a ball milling machine, or a wet mill microgrinder. In one embodiment of the additive aspect, the thermoset biopolyester comprises about 20% or higher of gel content.

BRIEF DESCRIPTION OF THE DRAWINGS

To better understand the invention, and to show more clearly how it may be carried into effect, embodiments will be described, by way of example, with reference to the accompanying drawings, wherein.

DETAILED DESCRIPTION OF EMBODIMENTS

Definitions

Figure 1A:
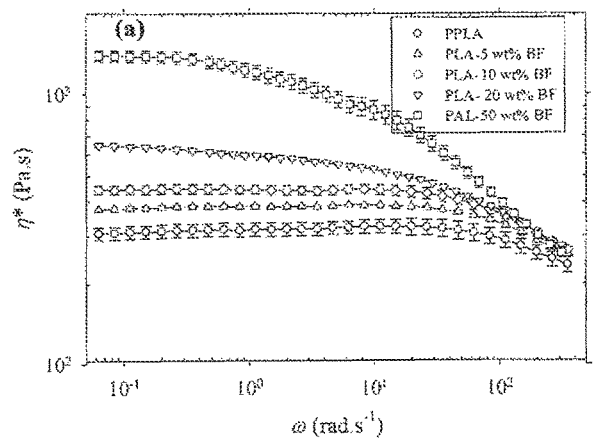
FIG. 1A graphically shows complex viscosity as a function of angular frequency of PLA and BF-reinforced PLA composite with specified BF loadings.

As used herein, the term "PLA" refers to polylactide or poly(lactic acid).

As used herein, the term "PHA" refers to poly-3-(hydroxyalkanoate).

As used herein, the term "PHB" refers to polyhydroxybutyrate

As used herein, the term "PCL" refers to polycaprolactone.

As used herein, the term "PBS" refers to polybutylene succinate.

As used herein, the term "PBAT" refers to poly(butylene adipate-co-terephthalate).

As used herein, the term "PET" refers to polyethylene terephthalate.

As used herein, the term "DCP" refers to dicumyl peroxide, an example of a free radical initiator.

As used herein, the term "TAM" refers to triallyl trimesate, an example of an allylic coagent.

As used herein, the term "TAIC" refers to triallyl isocyanurate, an example of an allylic coagent.

As used herein, the term "PETA" refers to pentaerythritol triacrylate, an example of an acrylate based coagent.

As used herein, the term "TMPTMA" refers to trimethylolpropane trimethacrylate, an example of an acrylate based coagent.

As used herein, the term "BF" refers to an additive that is a nucleating and reinforcing agent that is useful for improving the thermo-mechanical properties of biopolyesters. As described herein, the BF additive is a particulate of thermoset biopolyester.

As used herein, the term "a-BF" refers to an acrylate based additive.

As used herein, the term "nucleating agent" refers to a material that induces nucleation, which refers to a first step in formation of either a new thermodynamic phase or a new structure.

As used herein, the term "BF-reinforced composite" refers to a composite material product prepared by mixing polyester and BF. In some instances, the polyester base is specified in the term, for example "BF-reinforced PLA composite".

As used herein, the term "thermoplastic", or "thermosoftening plastic", is a plastic material (e.g., polymer) that becomes pliable or moldable above a specific temperature and solidifies upon cooling.

As used herein, the term "fine" in regard to particle size of BF refers to a particle size that is sufficiently small to allow the BF to reinforce and nucleate a thermoplastic polyester; for example, a particle diameter of about 10 to about 150 micrometers.

As used herein, the term "thermoset" refers to a crosslinked material that has a substantial (e.g., 20% or higher) gel content. A primary physical difference between thermoset plastics and thermoplastics is that thermoplastics can be melted and remelted back into a liquid with the application of heat, whereas thermoset plastics remain in a permanent solid state. That is, thermoset materials are non-reversibly crosslinked to an extent that they do not melt to form a liquid, thus a thermoset material would not be suitable for melt processing (e.g., not suitable to be pelletized via an extruder) when undiluted by a thermoplastic.

As used herein, the term "biobased" or "bioderived" means derived, in whole or in part, from plant, animal, marine, or forestry products.

As used herein, the term "biodegradable" means compostable or degradable under certain conditions.

As used herein, the term "biopolyester" means a polyester that is biobased, bioderived, and/or biodegradable.

As used herein, the term "conditioned" refers to a material which has been subjected to controlled crystallization conditions.

EMBODIMENTS

Described herein are composite materials comprising thermoplastic polyester and a particulate material that acts to reinforce the thermoplastic polyester. The particulate material comprises thermoset biopolyester. In some embodiments, the thermoplastic polyester that is reinforced is a polyester derived from non-biobased sources (e.g., petroleum based).

In one embodiment, a biobased composite material comprises a biopolyester and a bioderived additive. The presence of the bioderived additive provides improved thermo-mechanical properties to the biopolyester, without affecting its status as a fully bioderived polyester. As described in the figures and examples herein, the biobased additive is added to a biopolyester to form a composite material. The composite material, which is referred to herein as BF-reinforced biopolyester, is biobased and has improved properties, including melt strength, impact resistance, and resistance to heat distortion relative to the biopolyester in the absence of the biobased additive.

In another embodiment, a biobased additive is provided that acts as both a nucleating and a reinforcement agent when present in polyesters (e.g., biopolyesters). Other embodiments are provided such as the biobased additive.

Also described herein are methods of making the composite material and the biobased additive, and articles of manufacture prepared using the composite material.

Although the biobased additive of embodiments of the present invention can be used for any thermoplastic polyester (e.g., conventional thermoplastic polyesters such as, for example, polyethylene terephthalate (PET), polybutylene terephthalate (PBT), polycaprolactone (PCL), polyethylene succinate (PES), polybutylene succinate (PBS), and poly(butylene adipate-co-terephthalate) (PBAT) and biodegradable polyesters (e.g., PCL, PBAT, PES, PBS)), the improved properties are particularly advantageous for bio-derived polyesters. Examples of thermoplastic bioderived polyesters include polylactide (PLA), poly-3-(hydroxyalkanoates) (PHAs) including polyhydroxybutyrate (PHB) and poly(3-hydroxybutyrate-co-3-hydroxyvalerate (PHBV).

Embodiments of the invention provide a biobased additive (BF) that acts as a nucleating and reinforcing agent when present in thermoplastics such as biopolyesters (e.g., biobased and/or biodegradable polyesters). BF is particularly suitable for bioplastics since a primary component of BF is biobased (e.g., PLA, PHA) or biodegradable (e.g., PCL, PBS, PBAT). Presence of BF improves thereto-mechanical properties of polyesters such as melt strength, impact resistance, and resistance to heat distortion. It also reduces or even eliminates the need for other additives such as plasticizers and traditional nucleating agents. Further, it eliminates the need for an annealing step to induce crystallization that is required for adequate processability in biopolyesters or composites thereof with traditional nucleating agents/processing additives. Advantageously, such an annealing step is not necessary for a BF-reinforced composite.

In one embodiment, a method of making BF is provided. BF has three components, its main component is a biopolyester, and there are two other components: a free-radical initiator (e.g., DCP), and a crosslinking agent (e.g., an allylic based coagent such as TAM or an acrylate based coagent such as PETA). In one embodiment, BF is prepared by mixing and heating a biopolyester. The temperature to which it should be heated should melt the biopolyester and be at or above the decomposition temperature of the initiator. Once heated, and while mixing, about 0.5 wt % to about 2.5 wt % free-radical initiator and about 0.5 wt % to about 2.5 wt % of crosslinking agent are added. Mixing continues while the crosslinking reactions occur, until a thermoset product is obtained. Although mixing, for example mechanical mixing, affects the particle size of the BF, optionally, a grinder is used to make the BF a particular particle size. Suggested BF particle size is a diameter of 10-150 micrometers. (The smaller the particle size, the more impact BF will have on reinforcing and nucleating a biopolymer.)

In one embodiment, BF is used as an additive to a biopolyester that is subsequently processed using thermoforming, injection molding, or extrusion. One example of an extrusion process is 3D printing. In one embodiment, BF is prepared from dried PLA that has been compounded (i.e., melt mixed) with DCP and TAM. Results provided herein show that the presence of 10 wt % BF in a biopolyester composite decreased the crystallization half-time of the biopolyester composite by ten-fold. A suggested range of the amount of BF in the biopolyester composite is from about 1 wt % to about 50 wt %.

In one embodiment, a BF-reinforced composite is provided that is prepared from a biopolyester and a thermoset additive prepared from: a biopolyester; a crosslinking initiator; and an allylic based coagent. In one embodiment, a BF-reinforced composite is provided that is prepared from a polyester, a crosslinking initiator and an acrylate based coagent. Examples of allylic based coagents include TAM, or TAIC, An example of an acrylate based coagent is PETA.

An example of a crosslinking initiator is DCP. Other examples include Luperox® L101, Luperox® L130.

PLA can be processed using conventional thermoplastics processing equipment including injection molding, blow molding, film casting, etc. However, PLA has a narrow processing window because of its sensitivity to processing temperatures that are too high above its melting point. Additionally, PLA has a lack of melt strength, a slow crystallization rate, and is considered to have poor engineering properties such as impact strength and heat distortion resistance. Such drawbacks have limited the applicability of PLA to low-cost commodity applications (e.g., food packaging) and biomedical applications (e.g., drug delivery) where biocompatibility and biodegradability are desired.

Properties of PLA depend significantly on its molecular weight and the stereochemical makeup of its polymer backbone which is controlled by polymerization with D-lactide, L-lactide, or D,L-lactide, to form random or block stereocopolymers. The rheological properties of PLA depend on the molecular weight and molecular weight distributions (MWD), presence of branching, and the stereochemical makeup. Commercially available linear PLA is reported to lack the level of strain hardening, and therefore melt strength, needed for normal processing operations, limiting the success of PLA in operations involving high stretch rates such as film blowing, thermoforming, and foaming.

Nucleating agents are commonly added to impart crystallinity, or to enhance crystallization kinetics (Li, H., et al., *Polymer*, 48(23), 6855-6866 (2007), Withey R. E., et al., *Polymer*, 40(18), 5147-5152 (1999).). Nucleating agents work by providing sites around which polymer chains can crystallize. They can alter the crystallization temperature and thus the rate of crystallization. For neat PLA, even with the addition of nucleating agents, an annealing step is still required to induce crystallization, and to obtain satisfactory heat distortion resistance. Generally in PLA the maximum achievable crystallinity is dictated by the amount of D-lactide. Mixtures of D-lactide and L-lactide based PLA can crystallize in the form of a stereocomplex, which improves the temperature resistance of the material, while also acting as a nucleating agent for the crystallization of PLA.

Various nucleating agents have been tested in PLA and PHB formulations to promote crystallization including talc, sodium stearate, calcium lactate etc., often together with a plasticizer. Various nanofillers have also been tested in PLA, and PHAs. More recently, biobased cellulosic additives, such as cellulose nanowhiskers, nanofibers, and nanocrystals have been used to achieve reinforcement and to increase the crystallization rate of biopolymers, while maintaining the completely biobased nature of the formulations. This approach comes with many challenges, given the incompatibility with polymer matrices, which necessitates the use of various functionalization methods, such as silylation of the cellulose nanocrystals.

Advantageously, the reinforced biopolyester is substantially all biobased. Assuming 10% for an amount of reinforcing additive and 90% as the amount of matrix biopolymer, with the additive being 2% DCP and TAM, the resulting amount is 0.2% non-biobased material and 99.8% biobased material. Assuming 2% for an amount of reinforcing additive results in an even higher amount of biobased material.

In one embodiment, an article of manufacture is provided that is made from BF-reinforced composite materials, prepared from mixing BF and polyesters (e.g., PLA, PHA and/or PCL). Such articles include a wide range of articles from clothing, packaging (e.g., clam shell type food packaging), bottles, office stationary, food containers, disposable cutlery, disposable cups, disposable plates, toys, an article of manufacture made from plastic, injection molded articles, consumer products, building materials, products of 3D printing/additive manufacturing, packaging, foams, and automotive applications. PLA, as well as PHAs and PCL are used in biomedical applications. Accordingly, BF-reinforced PLA, BF-reinforced PHA, and BF-reinforced PCL offer improved properties and are also suitable for use to prepare biomedical articles, such as sutures, stents, dialysis media, and drug delivery devices.

As described in the Working Examples and shown in the figures, tests were conducted to quantify the effect of the presence of various amounts of BF and a-BF in BF-reinforced PLA composite material samples versus neat PLA.

Referring to FIG. 1A, a graph is presented that shows complex viscosity as a function of angular frequency of PLA compared to composites of PLA and specified amounts of BF. These rheological measurements were conducted from low to high frequencies at 190° C.

Figure 1B:
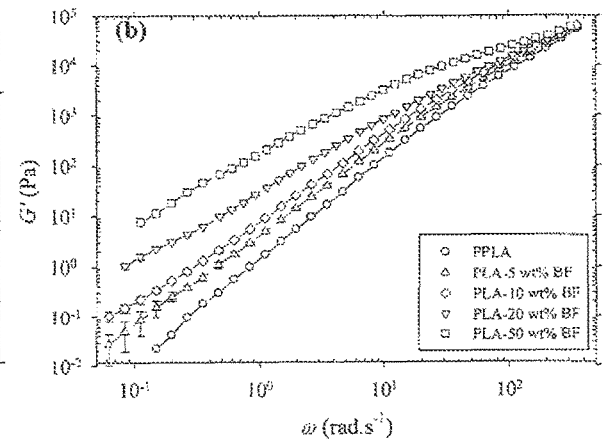
FIG. 1B graphically shows storage modulus as a function of angular frequency of PLA and BF-reinforced PLA composites with specified BF loadings.

Referring to FIG. 1B, a graph is presented that shows storage modulus as a function of angular frequency of PLA compared to composites of PLA and specified amounts of BF. These rheological measurements were conducted from low to high frequencies at 190° C.

Figure 2A:
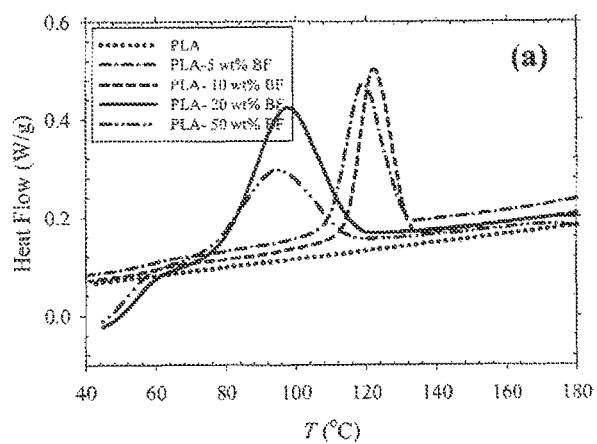
FIG. 2A graphically shows non-isothermal melt crystallization thermograms of processed PLA and BF-reinforced PLA composites with specified BF loadings at a cooling rate of 5° C./min.

Referring to FIG. 2A, a non-isothermal melt crystallization thermogram is shown of processed PLA and BF-reinforced PLA composites with various BF loadings, at a cooling rate of ° C./min.

Figure 2B:
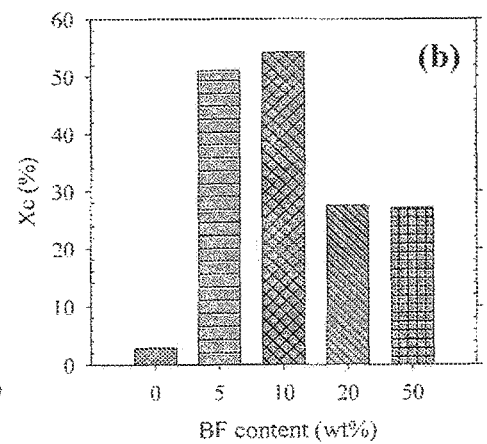
FIG. 2B graphically shows degree of crystallinity of processed PLA and BF-reinforced PLA composites with specified BF loadings at a cooling rate of 5° C./min.

Referring to FIG. 2B, a graph is shown that presents degree of crystallinity of processed PLA and BF-reinforced PLA composites with various BF loadings at a cooling rate of 5° C./min. Non-isothermal crystallization behavior from the melt state is of increasing technological importance since these conditions are the closest to industrial processing situations. The degree of crystallinity ($X_c$) was calculated according to Eq. 1.

$$X_c(\%) = \left(\frac{\Delta H_c - \Delta H_{CC}}{\Delta H_m^o\left(\frac{\phi_{PLA}}{100}\right)}\right) \times 100 \qquad \text{Eq. 1}$$

where $\Delta H_c$, $\Delta H_{cc}$ and $\Delta H^o_m$ are the enthalpy of fusion, and enthalpy of cold crystallization of the component and the melting enthalpy of perfectly crystalline PLA (93.6 J/g), respectively, and $\phi_{PLA}$ is the matrix weight percent in the samples. FIG. 2A shows that neat PLA exhibited no exothermic peak on the cooling curve, indicating that it does not crystallize during the cooling process. As expected, the inclusion of BF in the linear PLA significantly affected the degree of crystallization ($X_c$) and crystallization temperature ($T_c$). The degree of crystallinity, $X_c$ increases from 3 to 50 and 55% in the BF-reinforced PLA composite with 5 and 10 wt % of BF, respectively, as shown in FIG. 2B. The $X_c$ value, however, drops to 27% as the BF concentration in the BF-reinforced composite was further raised to 20 and 50 wt %. This phenomenon indicated that dispersed particles played a dual role during non-isothermal melt crystallization: increase of crystal nucleation induced by the heterogeneous mechanism, leading to enhanced degree of crystallinity, in competition with the restriction of chain mobility that makes chain packing in the crystal structure more difficult. Due to strong interactions between PLA polymer chains and BF, the PLA molecules at the surface of the dispersed particles were partially immobilized.

Figure 2C:
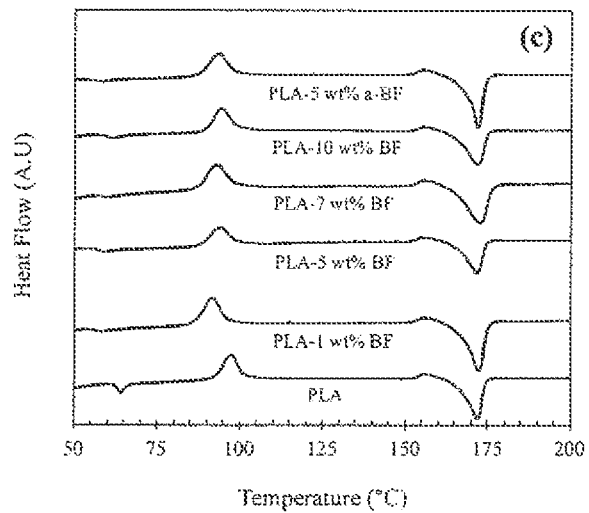
FIG. 2C graphically shows non-isothermal melt crystallization thermograms (first heating) of unconditioned PLA and BF-reinforced PLA composites, with specified BF and a-BF loadings at a cooling rate of 5° C./min.

Referring to FIG. 2C, a non-isothermal melt crystallization (first heating) thermogram is shown of unconditioned PLA and BF-reinforced PLA composites with various BF loadings at a heating rate of 5° C./min. Both unconditioned BF-reinforced PLA composites and PLA showed similar thermal properties.

Figure 2D:
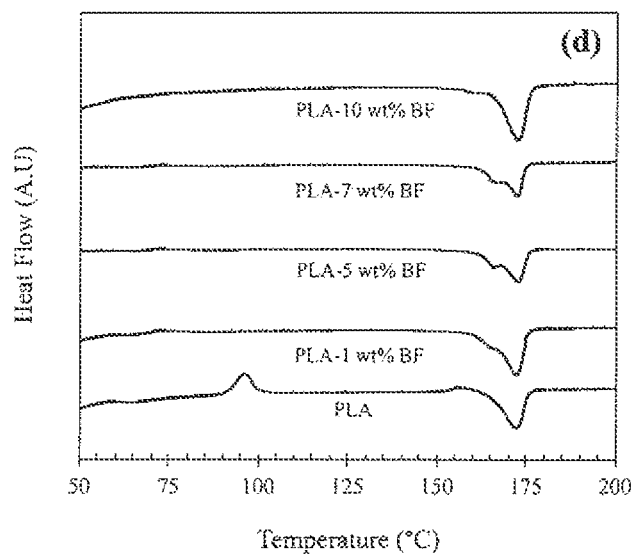
FIG. 2D graphically shows non-isothermal melt crystallization thermograms (first heating) of PLA and BF-reinforced PLA composites, containing specified BF and a-BF loadings at a cooling rate of 5° C./min, conditioned at 100° C.

Referring to FIG. 2D, a non-isothermal melt crystallization (first heating) thermograph obtained at a heating rate of 5° C./min is shown of PLA and BF-reinforced PLA composites with various BF loadings that were conditioned at 100° C. prior to testing. The BF-reinforced PLA composites do not exhibit the cold crystallization peaks that are characteristic of the neat PLA. This shows that the BF samples have attained substantial amounts of crystallization upon conditioning. Contrarily, a cold crystallization peak is present in the a-BE sample, consistent with PLA.

Figure 2E:
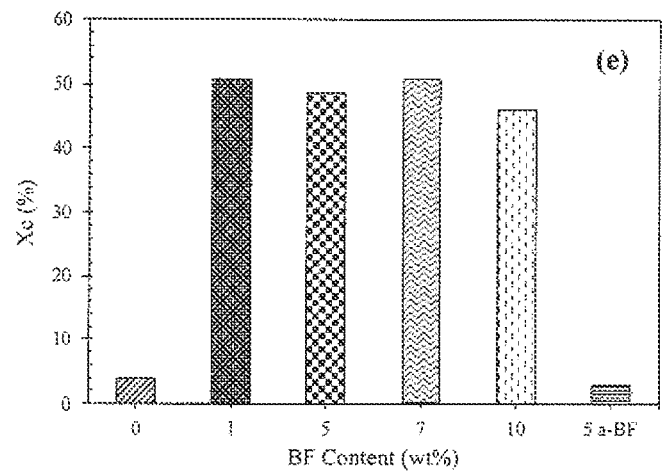
FIG. 2E graphically shows degree of crystallinity of PLA and BF-reinforced PLA composites with specified BF loadings at a heating rate of 5° C./min for the first heating; samples were conditioned at 100° C. prior to the experiments.

Referring to FIG. 2E, a graph is shown that presents the crystallinity of conditioned PLA and BF-reinforced PLA composites with various BF loadings, obtained from the first heating scan. The degree of crystallinity was calculated as previously described. As expected, exposure to controlled crystallization conditions results in higher crystallinities in the BF samples compared to PLA alone.

Figure 3:
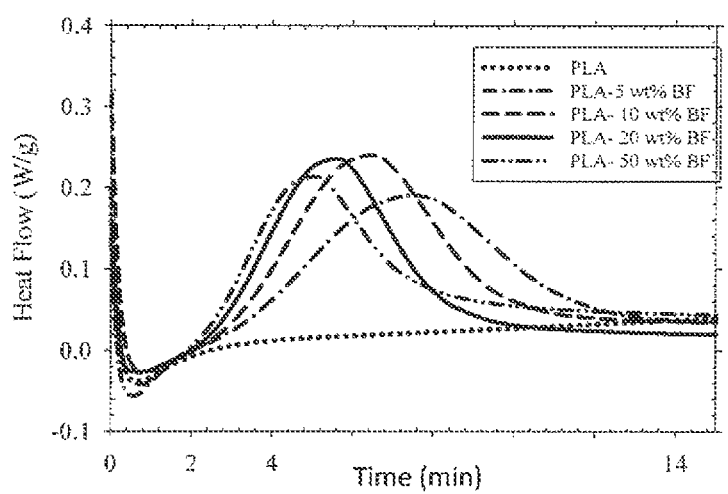
FIG. 3 shows isothermal crystallization thermograms of PLA and BF-reinforced PLA composites with specified BF loadings at 130° C.

Referring to FIG. 3, a plot is shown to display isothermal crystallization behavior of BF-reinforced composites at $T_c$ of 130° C. As shown, incorporation of BF into PLA significantly promoted the onset of crystallization and promoted the crystallization rate. It is believed that the inclusion of BF particles led to an enhancement of the density of nuclei, increasing the crystallization rate at the early stage of crystallization.

Figure 4:
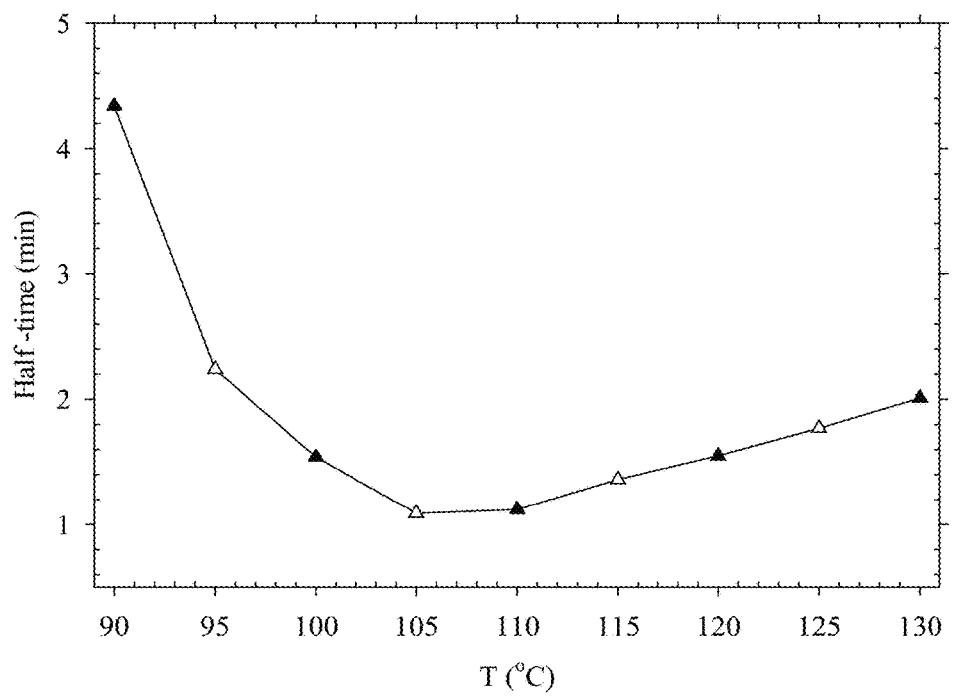
FIG. 4 shows crystallization half-times ($t_{1/2}$) of PLA with 10 wt % BF as a function of crystallization temperature (Tc).

Referring to FIG. 4, crystallization half times were calculated and plotted in FIG. 4. At low-crystallization temperatures, the decreased chain mobility significantly retarded the crystallization rate, whereas at high-crystallization temperatures, a considerable decrease in nucleation density hindered the crystallization growth although the chain mobility was high. Notably, the crystallization half time of PLA was above 10 min at 110° C. while it dropped to 1 min after the inclusion of 10 wt % BF. This result confirms the marked nucleating effect of BF in BF-reinforced PLA.

Figure 5A:
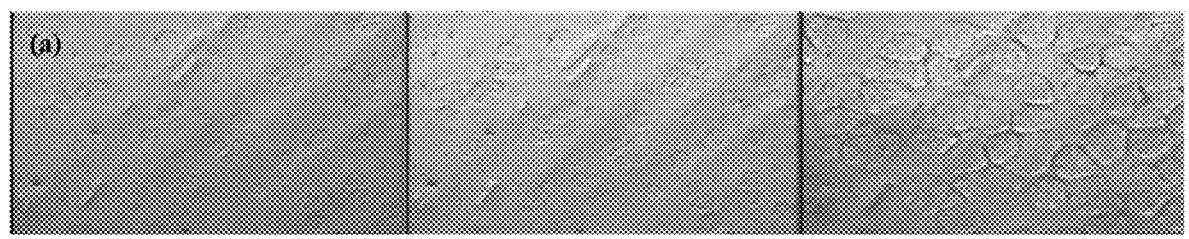
FIG. 5A shows polarized optical micrographs of neat PLA isothermally crystallized at 130° C.

Referring to FIG. 5A, a polarized optical micrograph is shown of neat PLA isothermally crystallized at 130° C.

Figure 5B:
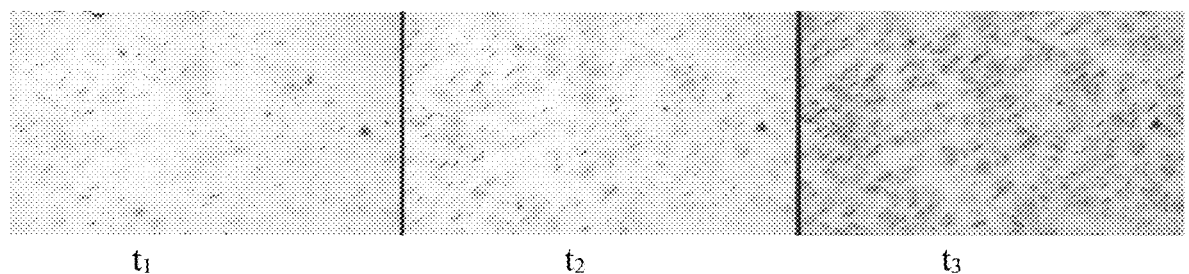
FIG. 5B shows polarized optical micrographs of BF-reinforced PLA composite with 10 wt % BF isothermally crystallized at 130° C.

Referring to FIG. 5B, a polarized optical micrograph is shown of a BF-reinforced PLA composite (10 wt % BF) isothermally crystallized at 130° C. The nucleating effect of the biofiller is evident by the change in the spherulitic morphology and spherulite density of crystallized PLA. In the presence of the nucleating agent, more spherulites nucleate and grow, thus increasing their density, while limiting their size.

Figure 6:
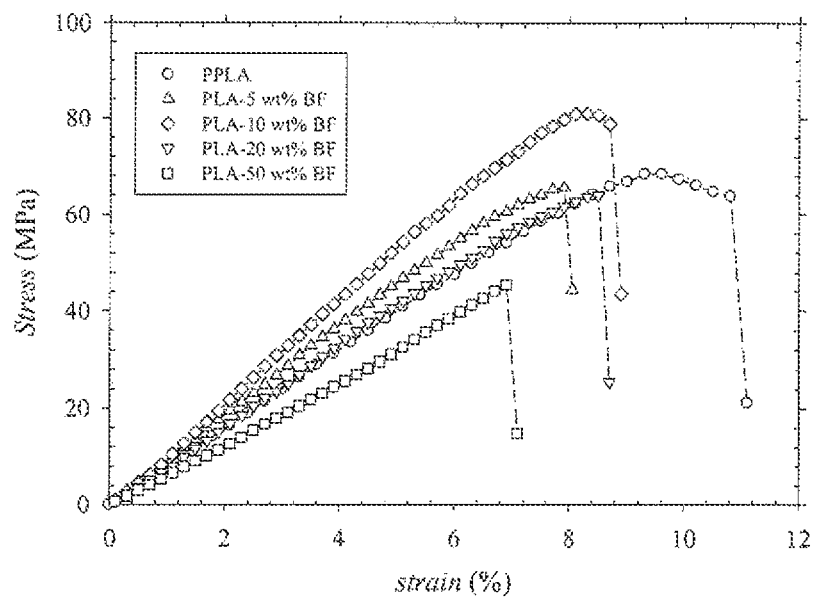
FIG. 6 graphically shows tensile mechanical properties of PLA and BF-reinforced PLA composites with specified BF loadings.

Referring to FIG. 6, a plot is shown that graphically shows tensile mechanical properties of PLA and BF-reinforced PLA composites with various BF loadings.

Figure 7A:
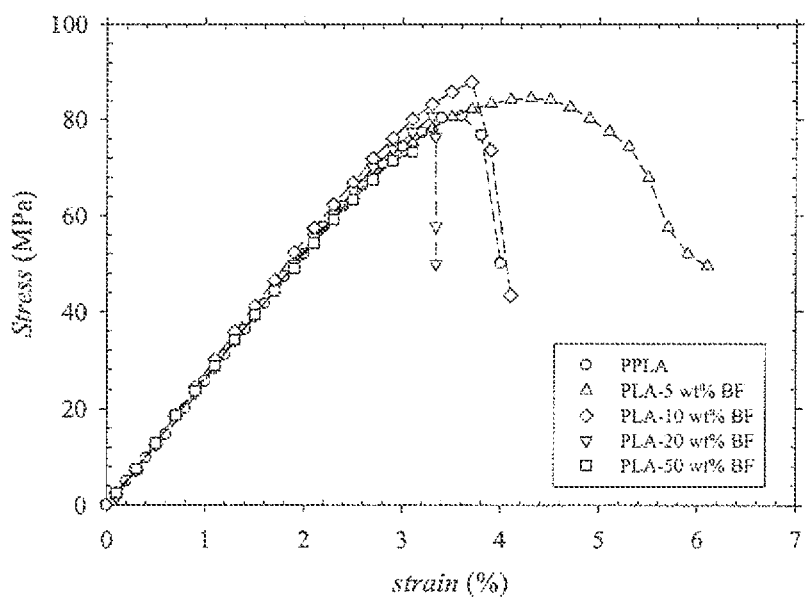
FIG. 7A graphically shows flexural behavior of PLA and BF-reinforced PLA composites with specified BF loadings.

Referring to FIG. 7A, a plot is shown that graphically shows flexural behavior of PLA and BF-reinforced PLA composites with specified BF loadings.

Figure 7B:
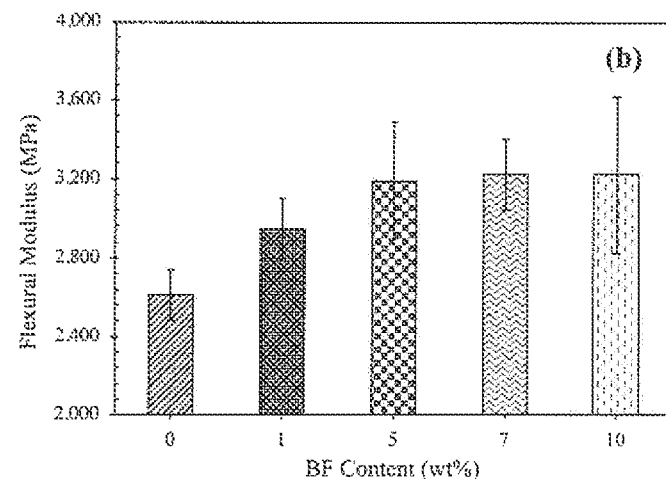
FIG. 7B graphically shows flexural moduli of PLA and BF-reinforced PLA composites with specified BF loadings, conditioned at 100° C.

Referring to FIG. 7B, a graph is shown of the flexural moduli for the conditioned at 100° C. BF-reinforced PLA composites at specified BF loadings. All BF-reinforced PLA composites have higher flexural moduli compared to PLA alone.

Figure 8A:
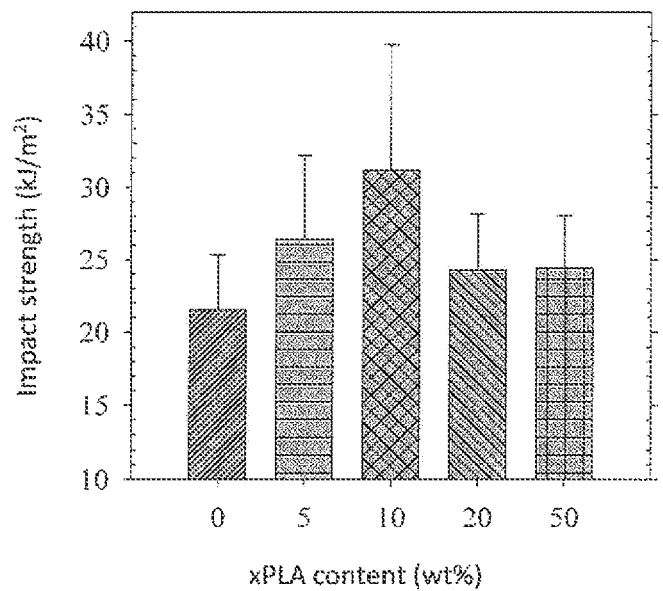
FIG. 8A graphically shows notched-Izod impact strength of PLA and BF-reinforced PLA composites with specified BF loadings.

Referring to FIG. 8A, a graph is shown of notched-Izod impact strength tests of PLA and BF-reinforced PLA composites with specified BF loadings.

Figure 8B:
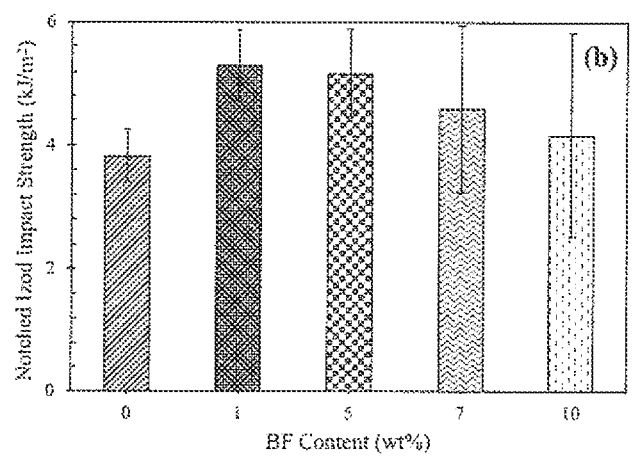
FIG. 8B graphically shows notched-Izod impact strength of PLA and BF-reinforced PLA composites with specified BF loadings; samples were conditioned at 100° C.

Referring to FIG. 8B, a graph is shown of notched-Izod impact strength results for conditioned at 100° C. PLA and BF-reinforced PLA composites at specified BF loadings. All BF-reinforced PLA composites have higher impact strength compared to PLA alone.

Figure 9A:
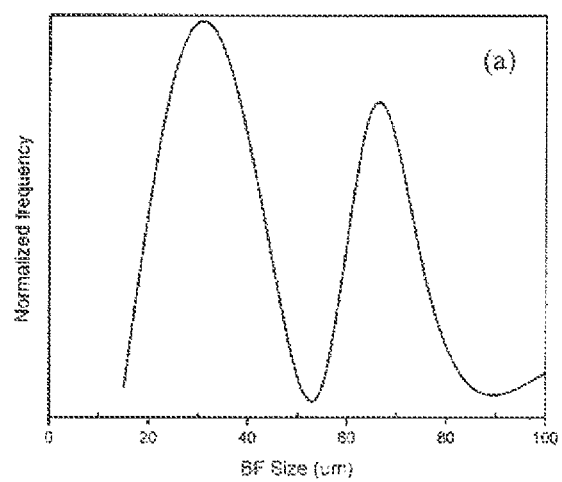
FIG. 9A graphically shows particle size distribution of one embodiment (10 wt % BF).

Referring to FIG. 9A, a graph is shown of the particle size distribution in one embodiment. Particle size is shown to range from 20 μm to 100 μm.

Figures 9B, 10:
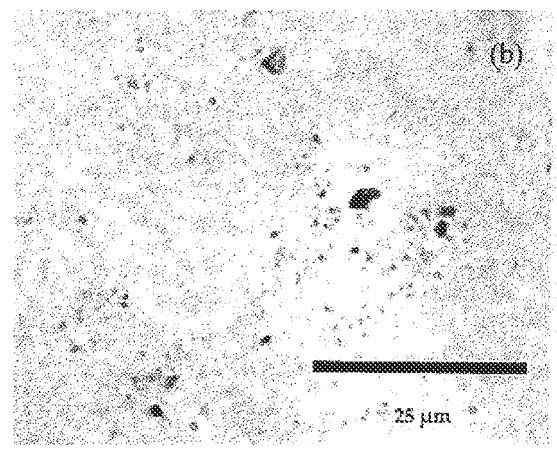
FIG. 9B visually shows particles in one embodiment (10 wt % BF).
FIG. 10 specifies the heat distortion temperature (HDT) of PLA and BF-reinforced PLA composites with specified BF loadings, conditioned at 100° C.

Referring to FIG. 9B, an optical microscopic image is shown of the particles dispersed evenly in one embodiment.

Referring to FIG. 10, a table is shown of the heat distortion temperatures (HDT) of conditioned PLA and BF-reinforced PLA composites at specified BF loadings. All BF-reinforced PLA composites were shown to have higher HDT than PLA.

Figure 11:
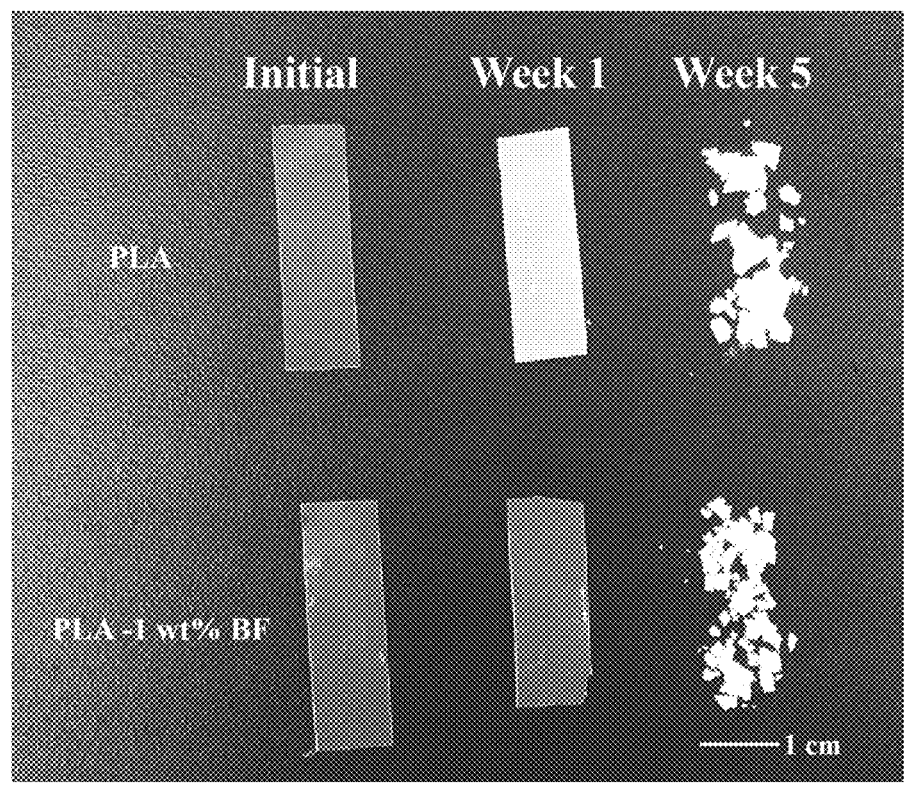
FIG. 11 visually shows the thin films degraded with time for PLA and PLA-BF at one embodiment (1 wt % BE), conditioned at 100° C.

Referring to FIG. 11 an image is shown where the visual comparison between PLA and PLA-BF show similar hydrolytic degradation after week 5.

Notably, the composite materials described herein have been shown to possess improved impact properties. As described in the Working Examples and shown in the figures, a variety of improved properties of BF-reinforced biopolyester relative to neat biopolyester have been observed and quantified. Samples of BF were tested for gel content as described in Example 9. A gel content of about 90% or higher was determined for a representative example of BF. Gel content of about 20% or higher is expected to have the reinforcing and nucleating effect on biopolyester that was shown herein. A gel content of about 20% or higher is not significantly deformed in the presence of heat and remains solid (i.e, does not melt) in the presence of heat and therefore is not suitable for melt processing.

The following working examples further illustrate embodiments of the invention and are not intended to be limiting in any respect.

WORKING EXAMPLES

Polylactide or PLA used in experiments described herein was PLA 3251D and was purchased from NatureWorks LLC Co. (USA). The selected grade is a semi-crystalline linear polymer with melt flow rate (MFR) of 35 g/10 min under a load of 2.16 kg at 190° C., and 80 g/10 min at 210° C. (ASTM D1238), as reported by the manufacturer. Dicumyl peroxide (DCP) and triallyl-trimesate (TAM), supplied by Sigma Aldrich and Monomer Polymer & Dajac Labs, respectively, were used as initiator and crosslinking agent in this work, respectively.

Example 1. Melt Compounding of PLA with DCP and TAM

Melt compounding of PLA with initiator and crosslinking agent was performed using a Haake Polylab R600 internal batch mixer. Before compounding, the PLA was dried at 60° C. in a vacuum oven for 24 h. The dried PLA was then directly mixed in the molten state with 1 wt % of dicumyl peroxide (DCP) and 1 wt % of triallyl trimesate (TAM), trimethylolpropane trimethacrylate (TMPTMA) at a set temperature of 185° C. The mixing was conducted at a rotation speed of 120 rpm for 10 min. The PLA was chemically reacted with the cross-linking agents during the melt compounding leading to the production of an agglomeration of thermoset (i.e., cross-linked) polymer. The thermoset polymer was then ground using a grinder to smaller size detached particles. A particulate of thermoset PLA that has a particulate diameter of about 10 to about 150 micrometers is referred to herein as BF.

The melt mixing of PLA with various quantities of BF (1, 5, 7, 10, 20 and 50 wt %) and a-BF (5 wt %) was carried out using the laboratory internal mixer (Haake) for 5 min under the aforementioned conditions.

The melt mixing of PHB with 5 wt % of BF was carried out using the Haake mixer under the aforementioned conditions. Based on preliminary results, the use of PHB does not offer any improvements compared with the PLA based materials.

To further investigate the effects of scale-up on the properties of the BF samples, melt mixing of PLA with 5 wt % BF was performed using a twin screw corotating extruder (Coperion ZSK 18 ML). The temperature profile was 170/190/190/190/190/190° C. (hopper to die). The extrusion was performed at a feeder speed of 30 min$^{-1}$ with a screw speed of 120 min$^{-1}$ and an average residence time of 2.5 min. No significant differences in thermal properties were detected between the Haake and Coperion processed samples.

Samples were subjected to controlled crystallization conditions using a Carver Hydraulic Press. The conditioned samples were molded at 190° C. for 5 minutes and were transferred to a compression molding machine at 100° C. After 5 minutes the mold was removed and the samples were extracted.

Example 2. Rheological Properties

The prepared disk-shaped samples were used to measure dynamic rheological properties. Small amplitude oscillatory shear (SAGS) experiments were conducted using a rotational rheometer with parallel plate flow geometry of 25 mm diameter and 1.0 mm gap size.

Example 3. Non-Isothermal and Isothermal Melt-Crystallization Behavior

The non-isothermal and isothermal melt-crystallization behavior of the samples were investigated using a differential scanning calorimeter, DSC-Q 1000 (TA Instruments, USA) under a $N_2$ atmosphere. In initial tests, samples (~10 mg) encapsulated in aluminum standard pans, heated at a scanning rate of 10° C./min from 30 to 190° C. and held for 5 min at this temperature. Samples were then cooled down to 30° C. at a rate of 5° C./min to determine the crystallization enthalpy (ΔHc) and degree of crystallinity (Xc).

In subsequent tests, samples were heated from 30 to 210° C. at a rate of 5° C./min and held for 5 min at this temperature. Samples were cooled down to –30° C. at a rate of 5° C./min.

Example 4. Isothermal Melt-Crystallization Behavior

The isothermal melt-crystallization behavior was studied at 90 to 130° C. All the specimens were first heated at 60° C./min to 200° C. and held there for 5 min. The molten samples were then cooled down to crystallization temperature (Tc) at 50° C./min. The samples were kept at Tc until the crystallization was complete.

Example 5. Tensile and Flexural Properties

Tensile and flexural properties were determined from the compression molded dog-bone and rectangular specimens, respectively. The samples were molded at 190° C. and were subsequently conditioned at 100° C. in temperature controlled compression molding platens. Tensile testing was performed according to ASTM D 638 on an Instron tensile machine equipped with a 5 kN load cell and a cross head speed of 5 mm min$^{-1}$. Flexural tests were performed according to ISO 178 with a cross head speed of 2 mm min$^{-1}$. All the mechanical tests were performed 48 h after molding and the reported values were obtained by averaging over eight specimens for each composition.

Example 6. Impact Strength

The rectangular compression molded bars that were conditioned at 100° C. were used to obtain the impact strength of composites of PLA and various amounts of BF particles. The Izod impact test was performed on notched samples using a pendulum impact tester (available from Satec System Inc.), according to ASTM D256. The values reported here are the averages of five specimens for each composition.

Example 7. Heat Deflection Temperature (HDT)

Specimens (127 mm×13 mm×3 mm) were prepared by compression molding using a Carver Hydraulic Press at 190° C. with a residence time of 5 minutes. The mold was removed and cooled at 100° C. for 5 minutes. Specimens were lowered in a silicon oil bath, and the temperature was increased from 23° C. at a heating rate of 120° C./h until 0.25 mm deflection occurred under a load of 1.82 MPa, in accordance with ASTM D648. At least three specimens were tested, and the average value was reported.

Example 8. Complex Viscosity (η*) and Elastic Modulus (G') of Processed PLA ("PPLA") and BF-Reinforced PLA The complex viscosity (η*) and elastic modulus (G') of the processed PLA (PPLA) and BF-reinforced PLA with specified BF amounts were plotted as functions of frequency (w) at 190° C. in FIGS. 1A and 1B. The incorporation of BF into the neat PLA changed its rheological response. The magnitude of the complex viscosity and elastic modulus were respectively increased by seven times and four order of magnitudes at low frequencies, depending on the BF content. Meanwhile, the transition from a Newtonian plateau to the so-called shear-thinning regime shifted to a lower frequency as BF content was increased. The observed change in the viscosity behavior was attributed to the BF-polymer and BF-BF interactions.

Example 9. Isothermal Crystallization Behavior

The isothermal crystallization behaviors of PLA and BF-reinforced PLA composites was investigated by DSC. Results in the form of thermograms for all systems at $T_c$ of 130° C. are presented in FIG. 3. The incorporation of BF into the PLA significantly promoted the onset of crystallization and increased the crystallization rate. The crystallization rate is, first, controlled by nucleation and then crystal growth and packing. It is believed that the inclusion of BF particles leads to an enhancement of the density of nuclei, increasing the crystallization rate at the early stage of crystallization.

To further analyze the effect of BF on the crystallization behavior of PLA, the isothermal crystallization behavior of BF-reinforced PLA with 10 wt % BF was investigated in a temperature ranging from 90 to 130° C. The crystallization half times ($t_{1/2}$) were calculated and plotted in FIG. 4. The $t_{1/2}$ value initially decreases with increasing the crystallization temperature, followed by an increase above 110° C. Such a behavior is expected in polymer due to a balance between two opposing effects. At low-crystallization temperatures, close to the glass transition temperature, the decreased chain mobility significantly retards the crystallization rate, whereas at high-crystallization temperatures, close to equilibrium melting temperature, a considerable decrease in nucleation density hinders the crystallization growth although the chain mobility is high. Notably, the $t_{1/2}$ of PLA is above 10 min at 110° C. while it, remarkably, drops to 1 min after the inclusion of 10 wt % BF. This result, indeed, confirms the marked nucleating effect of BF in BF-reinforced PLA.

Example 10. Particle Size Distribution

An optical microscope (Olympus BX51, Toronto, Canada) was used to observe compression molded specimens, BF was found to be evenly dispersed in one of the embodiments (10 wt %). Particle size ranged from 20 μm to 100 μm.

Example 11. Gel Content Study

Gel content analysis of BF was conducted by extraction into boiling chloroform from a 120 mesh stainless steel sieve for 6 hours, according to ASTM D 2765 (Takamura, M., et al., *Polym. Degrad. Stabil.*, 93 (2008) 1909-1916, and Sen-lin Yang, et al., *Polymer Testing* 27 (2008) 957-963).

Residual polymer was dried to constant weight, with gel content reported as a weight percentage of unextracted material. Gel contents of PLA samples have been quantified as low as 3 wt %, which is considered the detection limit, and as high as fully crosslinked. Gel content amounts between these low and high amounts are possible depending on the amounts of crosslinking agent(s).

Samples of BF were tested and found to be insoluble in chloroform. This result was interpreted as indicative of a gel content of about 90% or higher.

Example 12. Hydrolytic Degradation Study

Hydrolytic degradation tests were conducted at 60° C. in a Thermo Scientific Forma 3911 environmental chamber. Individual films with 1×3 cm² dimensions and a thickness of 200 μm were placed in tared scintillation vials containing 20 ml of phosphate buffer solution. On a weekly basis, two samples per formulation were extracted for further characterization and the PBS was replaced for all remaining vials.

Gel permeation chromatography (GPC) was performed using a Viscotek 270 max separation module equipped with triple detectors: differential refractive index (DRI), viscosity (IV), and light scattering (low angle, LALS and right angle, RALS). The separation module was maintained at 40° C. and contained two porous PolyAnalytik columns in series with an exclusion molecular weight limit of $20 \times 10^6$ g·mol-1. HPLC grade THF was used as the eluent at a flow rate of 1 mL·min$^{-1}$. Samples were prepared for GPC analysis by dissolving film cross-sections in THF to achieve solutions with concentrations of 2.5 mg ml$^{-1}$.

In preliminary tests, BF did not significantly impact the degradation of PLA. After 5 weeks of hydrolytic exposure, both non-BF reinforced PLA and PLA with 1 wt % BF were observed to undergo 94% loss in molar mass and 17% loss in mass. Also shown in FIG. 11, the samples showed similar breakdown of structural integrity.

All publications listed and cited herein are incorporated herein by reference in their entirety. It will be understood by those skilled in the art that this description is made with reference to certain preferred embodiments and that it is possible to make other embodiments employing the principles which fall within its spirit and scope as defined by the claims.

We claim:

1. A composite material, comprising:
   thermoplastic biopolyester; and
   a particulate additive comprising a thermoset biopolyester;
   wherein the biopolyester of the thermoplastic biopolyester and the biopolyester of the thermoset biopolyester are the same, and
   wherein the particulate additive reinforces and nucleates the thermoplastic biopolyester.

2. The composite material of claim 1, wherein the thermoplastic biopolyester is biodegradable.

3. The composite material of claim 1, wherein the thermoplastic biopolyester is bioderived.

4. The composite material of claim 1, wherein the thermoplastic biopolyester is polyethylene terephthalate (PET), polybutylene terephthalate (PBT), polycaprolactone (PCL), polyethylene succinate (PES), polybutylene succinate (PBS), poly(butylene adipate-co-terephthalate) (PBAT), poly(lactide) (PLA), poly-3-(hydroxyalkanoate) (PHA), polyhydroxybutyrate (PHB), poly(3-hydroxybutyrate-co-3-hydroxyvalerate) (PHBV), or a combination thereof.

5. The composite material of claim 1, wherein the thermoset biopolyester comprises biopolyester, free radical initiator, and a crosslinking agent.

6. The composite material of claim 5, wherein the amount of crosslinking agent is about 0.5 wt % to about 2.5 wt % of the thermoset biopolyester.

7. The composite material of claim 5, wherein the crosslinking agent is an allylic or acrylate crosslinking agent.

8. The composite material of claim 5, wherein the crosslinking agent comprises triallyl trimesate (TAM) or triallyl isocyanurate (TAIC).

9. The composite material of claim 5, wherein an amount of free radical initiator is about 0.3 to about 2.5 wt % of the thermoset biopolyester.

10. The composite material of claim 5, wherein the free radical initiator is dicumyl peroxide (DCP).

11. The composite material of claim 1, wherein the composite material is about 80 to about 99.9 wt % biobased.

12. The composite material of claim 1, wherein a ratio of thermoplastic biopolyester to thermoset biopolyester by weight is 99:1, 95:5, 90:10, 80:20, 70:30, 60:40, or 50:50.

* * * * *